(12) United States Patent
Zeh et al.

(10) Patent No.: US 10,746,993 B2
(45) Date of Patent: Aug. 18, 2020

(54) DETECTION DEVICE, HUD AND METHOD FOR OPERATING A HUD

(71) Applicant: Jabil Optics Germany GmbH, Jena (DE)

(72) Inventors: Oliver Zeh, Jena (DE); Thomas Beyer, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 50 days.

(21) Appl. No.: 15/648,615

(22) Filed: Jul. 13, 2017

(65) Prior Publication Data
US 2018/0017794 A1 Jan. 18, 2018

(30) Foreign Application Priority Data
Jul. 13, 2016 (DE) .................. 10 2016 112 826

(51) Int. Cl.
G02B 27/14 (2006.01)
G02B 27/01 (2006.01)

(52) U.S. Cl.
CPC ..... G02B 27/0149 (2013.01); G02B 27/0101 (2013.01); G02B 2027/013 (2013.01); G02B 2027/0181 (2013.01)

(58) Field of Classification Search
CPC ............ G02B 27/0149; G02B 27/0101; G02B 2027/013; G02B 2027/0181; G02B 27/0172; G02B 2027/0132; G02B 2027/011; G05D 23/27
See application file for complete search history.

(56) References Cited

U.S. PATENT DOCUMENTS

| 5,373,135 A | 12/1994 | Beyer et al. |
| 6,791,057 B1 | 9/2004 | Kratzsch et al. |
| 7,550,698 B2 * | 6/2009 | Fergason ................ A61F 9/067 250/201.1 |
| 2005/0007504 A1 * | 1/2005 | Fergason ................ G01S 3/783 349/14 |
| 2006/0238877 A1 * | 10/2006 | Ashkenazi ......... G02B 27/0093 359/630 |

(Continued)

FOREIGN PATENT DOCUMENTS

| DE | 1954609 U | 2/1967 |
| DE | 3926859 A | 7/1990 |
| WO | 2015/162836 A1 | 10/2015 |

*Primary Examiner* — Alicia M Harrington
(74) *Attorney, Agent, or Firm* — Young Basile Hanlon & MacFarlane, P.C.

(57) ABSTRACT

Described is a detection device, a head-up display (HUD) and a method for operating a HUD. The detection device, the HUD and the method for operating an HUD are designed to protect an imager of the HUD from damage by incident radiation and to avoid or at least significantly reduce a glare effect of the HUD. The detection device comprises an optical element with a reflecting area and a passband, where the optical transparency of the passband is greater than the optical transparency of the reflecting area. The passband is completely enclosed by the reflecting area, the surface of the passband is smaller than the surface of the reflecting area, and the detection device is optically coupled to the passband. The detection device determines the intensity of a radiation incident on the detection device.

16 Claims, 3 Drawing Sheets

(56) References Cited

U.S. PATENT DOCUMENTS

| | | | |
|---|---|---|---|
| 2011/0128412 A1* | 6/2011 | Milnes | G02B 27/22 |
| | | | 348/231.99 |
| 2014/0111864 A1* | 4/2014 | Margulis | G02B 27/0172 |
| | | | 359/630 |
| 2015/0098029 A1 | 4/2015 | Sato et al. | |
| 2015/0323793 A1 | 11/2015 | Sakai et al. | |
| 2016/0306169 A1 | 10/2016 | Nambara | |
| 2018/0063508 A1* | 3/2018 | Trail | H04N 13/271 |

* cited by examiner

DETECTION DEVICE, HUD AND METHOD FOR OPERATING A HUD

FIELD OF INVENTION

The invention relates to a detection device, a head-up display (HUD) and a method for operating a HUD. In particular, the present invention relates to a detection device, an HUD, and a method for operating an HUD, which can angle-selectively and direction-selectively detect an incident radiation in the imaging system of an HUD for the suppression of radiation reflections. As a result, the imager of an HUD can be protected from damage by incident radiation, and a glare effect of the HUD by reflected radiation can be prevented or at least significantly reduced.

BACKGROUND

HUDs in vehicles usually consist of an imager and a mirror system with two or more mirrors, which are located together in the dashboard of the vehicle. In an HUD, the image information radiated by an imager is made accessible to a viewer, for example the driver of a motor vehicle or the pilot of an aircraft, as a virtual image in his viewing area. The size of the image generated by the HUD within the viewing area of the viewer is usually referred to as a field of view (FOV). The eyebox is called the area which defines the image-side opening angle and at which the different main and edge beams of the different field points intersect. Usually, the visibility of the displayed image information is limited to a certain spatial area within the vehicle so that the viewer should be at least with one eye within the head motion box (HMB) defined by the imaging system used. The HMB is usually rectangular with a size of approximately 220×80 $mm^2$. For current HUDs, the HMB is identical to the eyebox. The desired size of the eyebox and the FOV results in the necessary etendue, which must be provided by the imager.

The image sensor is used for the display and radiation of image information. A corresponding individual component is designated as the imager. This can be, for example, a TFT/LCD display or a pico projector. The imager usually comprises a so-called imager (image generator) for displaying the image information. Mostly TFT/LCD panels, DMD, LCoS, MEMS or similar are used as possible imagers. The imager can preferably be a pico projector with DMD/LCoS as an imager or also a simple TFT panel. If a TFT panel is used, the image information radiated by the TFT panel is made accessible to the viewer directly as a virtual image in the field of view. If a pico projector is used, it first generates an intermediate image on an additional intermediate screen, whereby this intermediate image essentially takes the function of a TFT panel. The intermediate image is then usually imaged into the eyebox of the viewer by a mirror system.

Incident radiation from outside the HUD into an HUD, in particular solar radiation, can lead to reflections at the imager or at other parts of the HUD imaging system. These reflections are particularly dangerous in vehicles, since this can lead to a massive impairment of the driver by glare and thus to the loss of control over the vehicle. The remaining occupants of a vehicle could also be blinded by the reflections, which have a negative effect on the general acceptance of HUDs in such vehicles. In addition, direct sunlight can lead to a strong heating up to an overheating, in particular, of TFT panels of actual HUDs, which negatively affects the expected lifetime of the imager. However, thermal influence also leads to the risk of overheating in HUD systems with diffusers, which can lead to changes in the material of the diffuser.

In order to increase the lifetime of the TFT panels used in HUDs, the TFT panel must therefore be protected from excessive sunlight. This can be done, in particular, if strong sunlight occurs, the TFT panel is dimmed or completely switched off, a cover is placed over the TFT panel or the HUD, or an optical component of the HUD is tilted for radiation deflection so that the incident solar radiation can be deflected in a light trap. For this purpose, for example, a critical temperature of at least one component of the HUD can be monitored. Furthermore, the intensity of an incident solar radiation on the TFT panel can be measured or estimated.

WO 2015/162836 A1 discloses an HUD having an estimator which estimates the relative position of the sun relative to its geographical position. The intensity of incident radiation on a TFT panel can then be estimated from a sun position calculated therefrom. Depending on the estimated radiation intensity, a control of the incident solar radiation on the TFT panel and an adjustment of the brightness of the TFT panel can then take place.

US 2015/0323793 A1 discloses an HUD with an automatic switch-off device, in which, when the HUD is not used, one of the mirrors of the HUD is placed in a protected position. In this way, the imager of the HUD can be protected against damage.

US 2015/0098029 A1 discloses an HUD in which a direct measurement of the intensity of incident solar radiation is carried out with the aid of an infrared radiation detector. For this purpose, one of the mirrors of the HUD is partially transparent to the infrared portion of a incident radiation on the mirror. In particular, the mirror can be a mirror which is reflecting in the visible spectral range and is at least partially transparent in the infrared. Depending on the measured intensity of an incident radiation, the background brightness of a TFT panel can be adjusted. Due to the special coating of the mirror, however, this method usually results in significantly higher production costs compared to conventional mirrors.

In order to avoid a glare effect by such reflections in current HUDs, in particular, the imager or an existing diffuser is not arranged at right angles to the main beam. Instead, they are positioned tilted relative to the main beam in the beam path of the HUD, because otherwise an incident solar radiation perpendicular to these components could blind a viewer or other persons. By means of a tilted arrangement, occurring reflections can be deflected into a light trap without glare. Furthermore, it is excluded that sunlight can fall on the imager at such an angle that it is reflected to the viewer.

If the imager is not adapted to such applications, less light would be available for the image than in the right-angled case. However, the light output can be improved by either obliquely illuminating the imager or adding an additional component (for example a foil with prisms) to deflect the light. Both variants, however, complicate the imager and thus increase its production costs. If, however, the imager is used telecentrically, which allows a better light output with lower production costs, a reflection of vertically incident solar radiation on the display must be reduced, for example, by deflecting the sunlight into a light trap via one of the mirrors of the HUD. Although in this case the virtual image of the HUD is no longer visible to the driver of a vehicle, but he is not blinded by the sun and can continue to observe the traffic.

However, future HUDs in vehicles will be based on Pico projectors, which no longer generate an intermediate image. The etendue is not enlarged (that means it is not a projector with a diffuser), but only a very small eyebox is illuminated, which must retrace the movements of the vehicle driver. Furthermore, future HUDs will not be installed exclusively in the dashboard of a vehicle, but, for example, partly in an area directly below the vehicle roof. This saves installation space in the dashboard due to the compact design of the entire imaging system. As a result, larger FOVs than in the past can be realized. In such directly projecting HUDs, however, tilting of the imager in order to avoid reflections may not be possible anymore. For example, a DMD as an imager must usually be used telecentrically in order to ensure an optimal and uniform illumination, in particular of the different colors of the DMD. For that matter the main beam of the system strikes the DMD perpendicularly.

Such a protective measure serves both the general traffic safety as well as the personal eye protection of a vehicle driver, whereby at the same time the imager can also be protected against damage caused by solar radiation. In order to avoid unnecessary erroneous triggering of the protective device, however, it is necessary, in addition to the actual intensity of an incident radiation into the HUD, to also recognize its potential glare effect on the driver of a vehicle or the rest of his occupants, and to initiate a corresponding protective measure only if necessary.

It is therefore an object of the present invention to provide a detection device, an HUD and a method for operating an HUD which overcome the described disadvantages of the prior art and which in particular allow, with little additional effort and at a low cost, to angle-selectively and direction-selectively detect an incident radiation in the imaging system of an HUD, whereby the occurrence of a possible glare effect leads to an adaptation of the HUD which at least attenuates the glare effect.

SUMMARY

The objectives are solved according to the invention by the independent patent claims. Embodiments of the invention are contained in the dependent claims.

The detection device according to the invention comprises an optical element with a reflecting area and a passband, whereby the optical transparency of the passband is greater than the optical transparency of the reflecting area, and a detector configured to determine the intensity of a radiation incident on the detector. The detection device is characterized in that the passband is completely enclosed by the reflecting area, the surface of the passband is smaller than the surface of the reflecting area, and the detector is optically coupled to the passband.

The optical element can preferably be a mirror, in particular a deflection mirror of a HUD. The optical element has a reflecting area with a high optical reflectivity and a low optical transparency of preferably less than 50%, less than 30% or less than 10%. Particular preference is given to an optical transparency of less than 5% or less than 1%. The passband of the optical element is preferably a area which is completely enclosed by the reflecting area, with a reflectivity which is reduced compared to the reflectivity of the reflecting area and an increased optical transparency of preferably greater than 50%, greater than 80% or greater than 90%. Particularly preferred is an optical transparency of greater than 95% or greater than 99%.

The reflecting area and the passband are preferably formed by a coating applied to the surface of a substrate. The two areas can preferably differ in the type or the effective thickness of the applied coating. Furthermore, it is preferred that the passband is formed as a through-opening in the optical element. For example, the passband may be a physical hole in the optical element. The through-opening can also be formed in that a corresponding coating has a coating defect in the reflecting area. As a result, a corresponding hole is likewise formed in the reflection layer. Preferably, the surface of the passband is less than 10%, less than 5%, less than 1%, or less than 0.2% of the surface of the reflecting area. Preferably, the surface of the passband is greater than 0.001%, greater than 0.01%, or greater than 0.1% of the surface of the reflecting area.

A detector, which is optically coupled to the passband, is arranged in such a way that the radiation transmitted in the area of the passband through the optical element can be detected direction-selectively and angular-selectively by the detector. In this case, it is particularly preferred that the detector detects exclusively a radiation passing through the passband and that radiation which is transmitted by a possible residual transparency of the reflecting area through the reflecting area is not detected. The detector can preferably be a photodiode, a photoresistor or a photocell.

Preferably, the detector has a minimum distance from the reflecting area which is greater than 1 mm, greater than 10 mm, or greater than 50 mm. Preferably, said minimum distance is less than 100 mm, less than 200 mm, or less than 500 mm. In particular, the detectable viewing area of the detector can be determined by means of the distance between the reflecting area and the detector in relation to the active area of the detector and to the surface of the passband. A projection of the active detector surface through the passband thereby defines a maximum solid angle range via the corresponding edge beams of the projection for a possible detection. By means of a corresponding adaptation of the optical coupling between the passband and the detector, for example, a radiation can be detected specifically which is incident on the optical element from a very specific solid angle range. The passband can be regarded as an aperture stop of the detector. If the passband additionally has an optically relevant depth (for example given by the spatial depth expansion of a hole in the optical element or by the thickness of a coating forming a passband or the corresponding thickness of a coating defect), a solid angle range can also be determined by the spatial position of the depth expansion of the passband with respect to the reflecting area of the optical element. The direction of the optical axis of the passband (for example, the axis of symmetry of the passband) in this case can deviate from the surface normal of the reflecting area locally adjacent to the passband.

The idea of the present invention is that the quality of the image in an optical image within an imaging system is generally only insignificantly influenced by a relatively small surface of the passband in relation to the total surface of the reflecting area of the optical element, and thereby in a simple and cost-effective manner a direction- and angle-selective detection of incident radiation can take place without fundamental changes to the imaging system. For example, a hole in a deflection mirror according to the invention does not usually interfere with an optical image and the imaging quality is retained. In this case, only a small fraction of the intensity is removed from the actual beam path of the imaging system (proportion of the radiation that falls through the hole behind the mirror). The incident radiation can be an optical radiation which generates the optical image. This can be used, in particular, for monitoring or controlling the optical properties of the image or the imager. Preferably, however, the incident radiation is an external radiation which interferes with the image or the imager. In particular, this may be daylight or a direct solar irradiation. The passband allows a direction-selective and angle-selective detection of incident radiation without significantly affecting the quality of an optical image within an imaging system.

If an irradiation occurring according to the monitored solid angle range of the detection device is detected, measures for protecting the imaging device can be initiated or, for example, glare of persons can be prevented or at least significantly reduced. As a result, the imager of an imaging system comprising the detection device can be used telecentrically as a directionally and angularly resolved detection of an incident radiation can take place specifically to avoid potentially dangerous reflections within the imaging system and at the same time monitoring of the intensity of the incident radiation to protect an imager is enabled. In particular, by means of a suitable device for attenuation, incident radiation can be reduced in its intensity. As a result, an imager can be protected from overheating (at the same time, the intensity of the imager can be increased for better visibility of the image). Furthermore, a targeted deflection of the incident radiation (for example into a light trap) can be take place to block the incident radiation.

The passband is preferably small in relation to the illumination of the optical element. The surface of the passband can be smaller the smaller the distance of the passband from the detector and the larger the active surface of the detector is. Preferably, the surface of the passband is smaller than the active surface of the detector. In particular, an optical element can also have a plurality of passbands separated from one another. The above-mentioned embodiments apply accordingly for each individual passbands. Thereby different solid angle ranges of incident radiation can also be detected simultaneously by a single detection device according to the invention or via a single detector. The individual detected angular areas can at least partially overlap.

It is particularly preferred that a first passband is aligned relative to a first detector in such a way that a solid angle range of an incident radiation is detected from which the incident radiation from an imaging system comprising the detection device would be reflected in a first direction and that a second passband is aligned relative to a second detector in such a way that a solid angle range of the incident radiation is detected from which the incident radiation from an imaging system comprising the detection device would be reflected in a second direction.

Furthermore, embodiments of a detection device according to the invention are preferred in which a plurality of mutually independent detectors are assigned to a single passband. The individual detectors can each be arranged at a different angle and/or a different distance from the common passband. The detectors can also have differently large active surfaces, so that in each case different solid angle ranges of a radiation incident on the optical element and transmitted through the passband can be detected. An arrangement of a plurality of passbands of an optical element each having a plurality of optically coupled detectors is also preferred.

The HUD according to the invention comprises an imager, adapted to impress an image information on an optical radiation; and an imaging system adapted to project the optical radiation; wherein the imaging system comprises a detection device according to the invention; wherein the imager and the imaging system are arranged to each other in such a way that a visible virtual image of an image information impressed on the optical radiation is displayed to a viewer.

Any information in pictorial form can be understood as image information. In the case of vehicles, this can be, for example, the instantaneous speed of the vehicle or information for expanding the reality in the view area of the vehicle driver or other occupants. The objective of the imager is to generate optical radiation from an image information transmitted to it. In this case, it is irrelevant whether the imager primarily generates the optical radiation with the image information (e.g. OLED) or whether the imager merely impresses the image information of the already generated optical radiation, for example by means of a DMD (digital micromirror device) on which light is irradiated without image information.

The generated optical radiation is projected through the imaging system along an optical beam path. The beam path is preferably directed by the imager via one or more deflection mirrors to a suitable means for generating a virtual image. For an HUD in motor vehicles, the means for generating a virtual image can preferably be an area of the windshield of the motor vehicle in the direct field of view of the motor vehicle driver. Preferably, the imager and the imaging system are arranged in such a way to each other to provide the vehicle operator with a visible virtual image of image information impressed on the optical radiation.

The imaging system comprises a detection device according to the invention, wherein the optical element of the detection device preferably comprising at least one of the deflection mirrors of the HUD. In particular, this can be a conventional HUD in which by means of a corresponding adaptation of one of the deflection mirrors of the HUD, a detection device according to the invention is completely integrated into the HUD. The passband of the detection device is particularly preferably a through-opening in one of the deflection mirrors in the form of a hole.

For such an exemplary embodiment, a hole of a defined size can be arranged as a passband in one of the deflection mirrors of the HUD. Behind this hole, a photodiode can be positioned corresponding to the desired solid angle range of detection. The distance of the photodiode from the hole in the deflection mirror, the size of the active surface of the photodiode and the size of the hole can be chosen in such a way that only a solid angle range of the sun (sun position with respect to the vehicle) is detected which would blind the driver of the motor vehicle or which would impinge on the imager (e.g. a TFT panel) through the imaging system. As a general rule, the further the photodiode is away from the hole and the smaller the hole, the smaller the received angle spectrum. The denser the photodiode is positioned from the hole and the larger the hole, the greater the received angle spectrum. The embodiments on the effect of the active surfaces of the detector and the direction of the optical axis of the passband, which are mentioned in the description of the detection device, apply accordingly.

Preferably, the optical element is arranged outside an intermediate image plane of the HUD. The intermediate image plane is thereof called any plane in the beam path of an imaging system in which a real image of an image information, which is impressed on the optical radiation, can be generated. If a deflection mirror of a conventional HUD is used as the optical element, iit is generally already situated outside an intermediate image plane of the HUD.

Preferably, the HUD comprises a light trap adapted to capture radiation incident into the HUD. If a radiation incident into the HUD is detected with the aid of the detection device, the incident radiation can be deflected into the light trap. Such deflection preferably happens by tilting a deflection mirror of the HUD so that the incident radiation is directed into the light trap. It is also preferred that a shutdown of the imager or of the HUD takes place for the protection of the imager. The light trap can be an area designed to absorb the incident radiation.

Preferably, the HUD comprises an attenuator adapted to attenuate a radiation incident into the HUD. In the attenuator, it can preferably be an actively controllable attenuator. If an incident radiation is detected with the aid of the detection device, the incident radiation can be attenuated in the intensity by the attenuator. As a result, the glare effect of the HUD can be prevented or at least reduced, and an imager of the HUD can be protected against overheating. Such an attenuation is preferably carried out by the introduction of an optical absorber into the beam path of the HUD so that the incident radiation is attenuated by the absorber. It is also advantageous that a protection of the imager is thereby effected. The absorber can be a gray glass, a gray wedge, or else a means for absorption suitable for attenuating incoming radiation. The attenuator can also be a beam splitter or a controllable filter element.

If the risk exists of blinding an occupant of a vehicle in which an HUD according to the invention is installed, a plurality of detectors can be used. These can be positioned within the detection device in accordance with the location of a potential reflection in addition to the detector, which is used to protect the vehicle driver. The individual detectors can each be optically coupled to a single passband of the optical element or a plurality of passbands of the optical element.

The detectors can each receive different solid angle ranges (or different sun positions with respect to the vehicle). Furthermore, the detectors can be deactivated if required. For example, if there are no other persons in a vehicle other than the vehicle driver, there may be no need to initiate a protective measure if a glare effect of the HUD only exists for the additional persons in the vehicle. An exact determination of the number and position of persons affected by a glare effect can be carried out, for example, by sensors already present in the interior of motor vehicles in the seats. Thus, the likelihood that the HUD unnecessarily be turned off can be reduced to a minimum.

The method according to the invention for operating a HUD comprises the provision of an HUD according to the invention; determining an intensity of radiation incident on the detection device; generating a control signal from at least one intensity determined by the detection device by a control device; an adaptation of the HUD in dependence on a control signal.

The control device evaluates the intensity (or a plurality of specific intensities) determined by the detection device according to the invention and, after an evaluation of the resulting glare and/or damage effect, generates a control signal which can be used, in dependence on the intensity of an incident radiation on the detection device, adjust the HUD in dependence on the control signal. In the generation of the control signal, the presence of an observer and/or a further person can be taken into account. Detection can, for example, take place by means of sensors in the interior of motor vehicles in the seats. Preferably, the generation of a control signal is based on the evaluation of the current operating state of the HUD. For example, a distinction can be made between a normal operating state, an overheated operating state, on/off operating state, safety-relevant or individually selected operating states. In particular, in a safety-relevant operating state for the display of safety-related image information, the initiation of protective measures in favor of a display of a safety-relevant image information is not required.

Preferably, an adaptation of the HUD is carried out by an attenuation of a radiation and/or an amplification of the optical radiation of the imager. Preferably, an imager of the HUD or the entire HUD can be deactivated. It is also preferred that an adaptation of the HUD is carried out by a change of the angle and/or the position of at least one optical element of the HUD for directional deflection of a radiation. In particular, said optical element can be the same optical element, which is also comprised by the detection device. The directional deflection can preferably take place for deflecting a radiation incident into the HUD into a light trap. Furthermore preferred is, that the deflection of incident radiation is in such a way that a glare effect of the HUD is avoided or at least significantly reduced. In particular, in the case of an HUD with variable FOV or the possibility of a locally variable positioning of the illustrated image information (e.g. within a specific area of the windshield of a vehicle), a virtual display of an image information impressed to the optical radiation of the imager can be shifted in such a way that a glare effect of an observer and/or a further person is avoided or at least significantly reduced.

BRIEF DESCRIPTION OF THE DRAWINGS

The invention is explained below in exemplary embodiments based on the accompanying drawings. In particular.

DETAILED DESCRIPTION OF THE PREFERRED EMBODIMENTS

Figure 1:
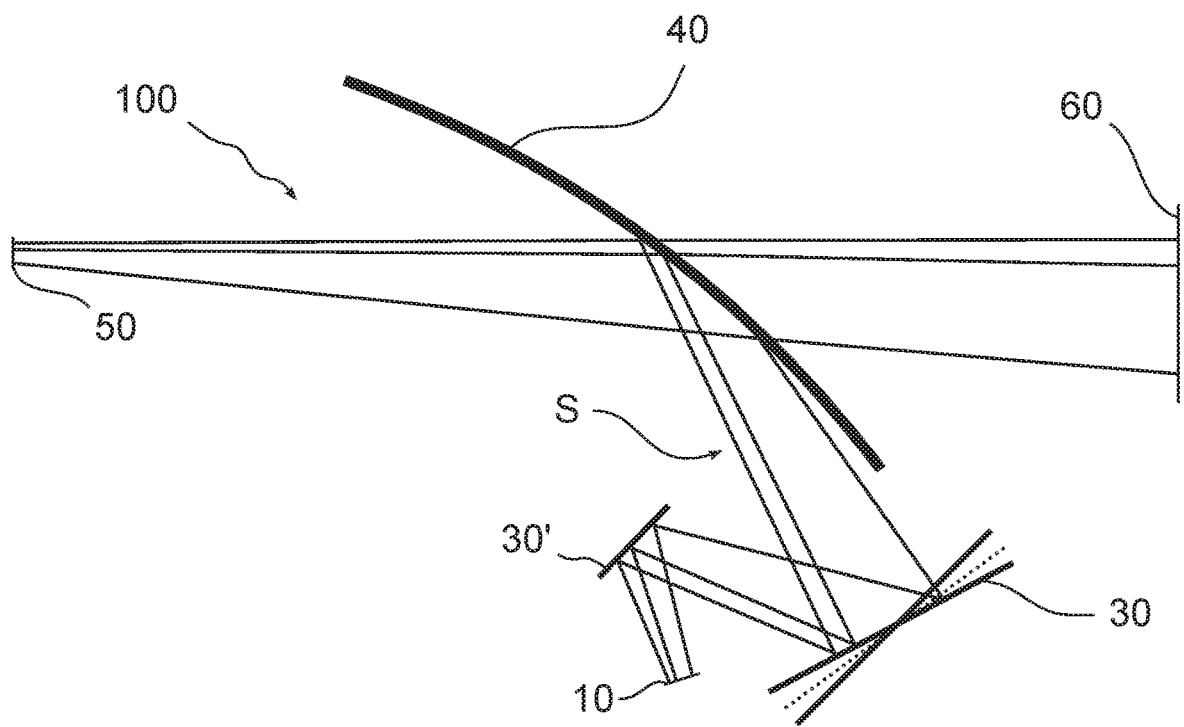
FIG. 1 is a schematic illustration of a conventional HUD.

FIG. 1 shows a schematic illustration of a conventional HUD 100. An image information is impressed on an optical radiation S by means of an imager 10. The optical radiation S is then projected along a fixed beam path by an imaging system 30, 30', 40 in such a way that by means of reflection on a windshield 40 (or a helmet visor, a protective screen of an aircraft or other suitable surface for displaying virtual image information) a virtual image 60 of image information impressed on the optical radiation S is displayed to a viewer 50. The imaging system 30, 30', 40 comprises a first deflecting device 30 and a second deflecting device 30', which are designed to enable the compactest possible convolution of the beam path within the HUD. In particular, the deflecting devices 30, 30' can be deflection mirrors. The deflection mirrors can preferably be designed planar or curved. The first deflecting device 30 can preferably be changed in its spatial position, so that a targeted tilting of the beam path for beam guidance and beam control is possible.

The radiation incident into the imaging system 30, 30', 40 at certain angles, for example from above the windscreen 40, can be reflected by individual optical components of the HUD, in particular surfaces which are oriented perpendicularly to the incident radiation, and can lead to the blind an observer 50 and/or other persons. Furthermore, an overheating or damage of the imager 10 can occur due to radiation (e.g., solar radiation) incident on the imager 10.

Figure 2:
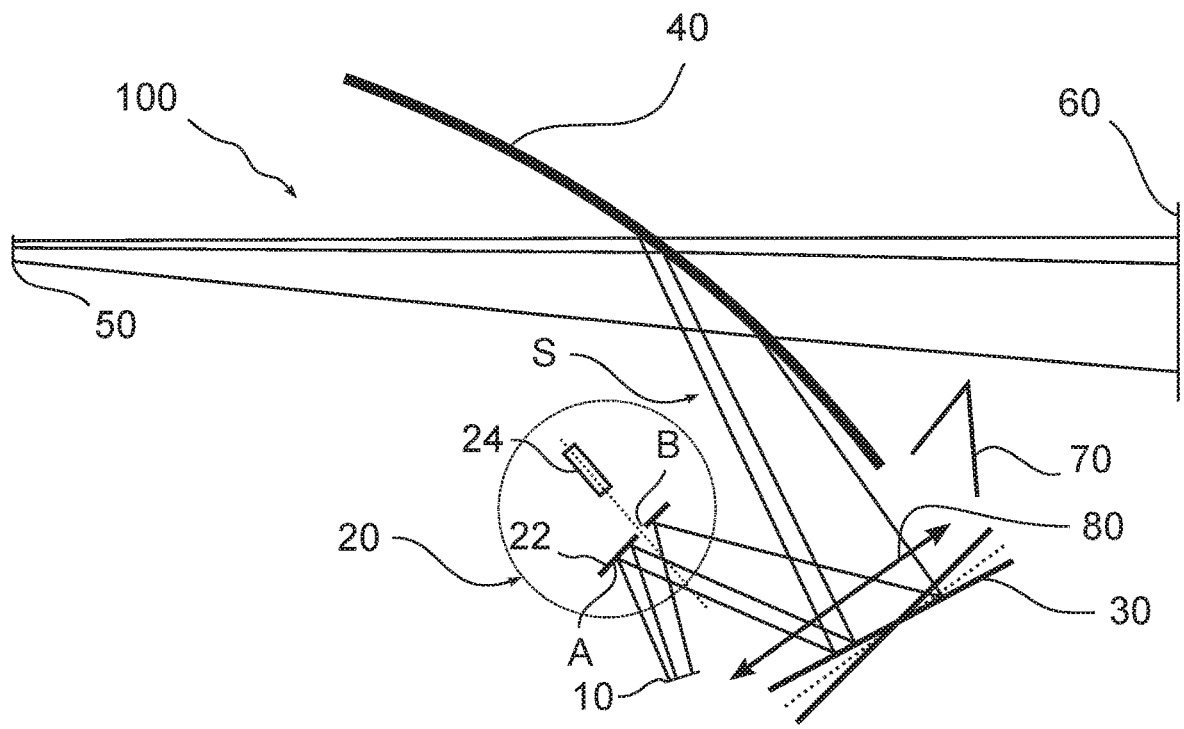
FIG. 2 shows a schematic illustration of an embodiment of an HUD according to the invention.

FIG. 2 shows a schematic illustration of an embodiment of an HUD according to the invention. The basic structure of the HUD largely corresponds to the arrangement shown in FIG. 1. The individual reference symbols and their assignment apply accordingly. In the embodiment shown, one of the two deflecting devices 30, 30' shown in FIG. 1 (i.e., the deflecting device 30') has been extended to form an optical element 22 according to the invention (also in the form of a deflection mirror) of a part of a detection device 20 according to the invention. In particular, the optical element 22 shown has a through-opening positioned in the center of the optical element 22, whereby the through-opening forms a passband B, which is completely enclosed by a reflecting area A. Behind the passband B, a detector 24 is arranged, which can detect a radiation transmitted through the passband B. The illustration also shows a light trap 70 through which a radiation incident at specific angles from the windscreen 40 into the imaging system 22, 30, 40 can be captured.

Preferably, a radiation incident from outside into the HUD 100 is deflected into the light trap 70 by a spatial positional change of at least one of the deflection mirrors. Also preferred is an attenuation of a radiation incident into the HUD 100 through an attenuator 80. This can preferably be a variable attenuator 80, for example a gray or green wedge which can be pivoted mechanically into the beam path of the HUD 100, wherein the wedge enables a defined attenuation of the incident radiation in a corresponding manner to an intensity determined by the detector 24. The positioning of detection device 20, light trap 70 and attenuator 80, selected in the illustration, represents only one possible embodiment of an HUD 100 according to the invention. In particular, the detection device 20 according to the invention can also be configured in the area of the deflection mirror 30. The detection device 20 may also comprise one or more additional optical elements (towards a conventional HUD).

Figure 3:
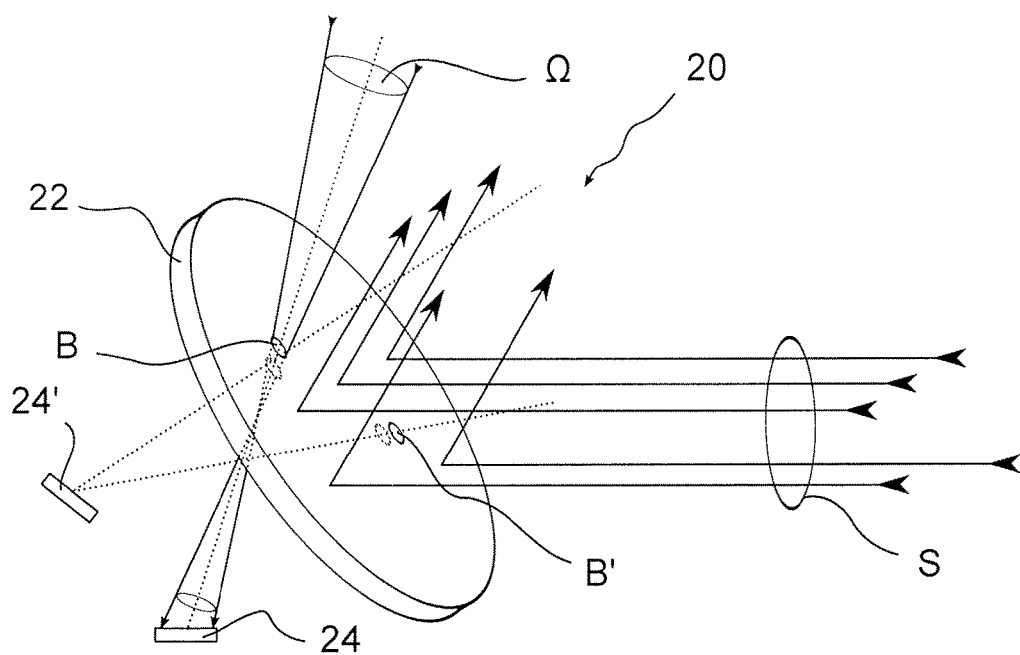
FIG. 3 is a schematic illustration of an embodiment of a detection device according to the invention.

FIG. 3 shows a schematic illustration of an embodiment of a detection device 20 according to the invention. The detection device 20 comprises an optical element 22 with a reflecting area A and two passbands B, B', wherein the optical transparency of the passbands B, B' is greater than the optical transparency of the reflecting area A. In particular, the optical element 22 can be a mirror with a reflection layer. The passbands B, B' are embodied here as through-openings in the form of holes. The direction of the optical axis of the passbands 30, 30' differs from the surface normal of the areas of the reflecting area A which are locally adjacent to the passbands 30, 30'. As a result, in particular, the direction and a solid angle range Ω of an incident radiation can be defined for direction-selective and angle-selective detection of the radiation. On the optical element 22, an optical radiation S belonging to an imaging beam path is preferably deflected in a second direction from a first direction (for example, from the direction of the imager). Only a small proportion of the optical radiation S is transmitted by the passbands B, B'.

The detection device 20 further comprises two detectors 24, 24', which are designed to determine the intensity of a radiation incident on the detectors 24, 24'. For this purpose, the detectors 24, 24' are optically coupled to the passbands B, B'. In particular, the detector 24 can detect a radiation incident from the solid angle range Ω, which is transmitted by the passband B. Due to the mutual arrangement of the individual passbands B, B' and the detectors 24, 24', certain, for example, disjoint or at least partially overlapping, solid angles ranges of a radiation incident on the detection device 20 can be detected.

Figure 4:
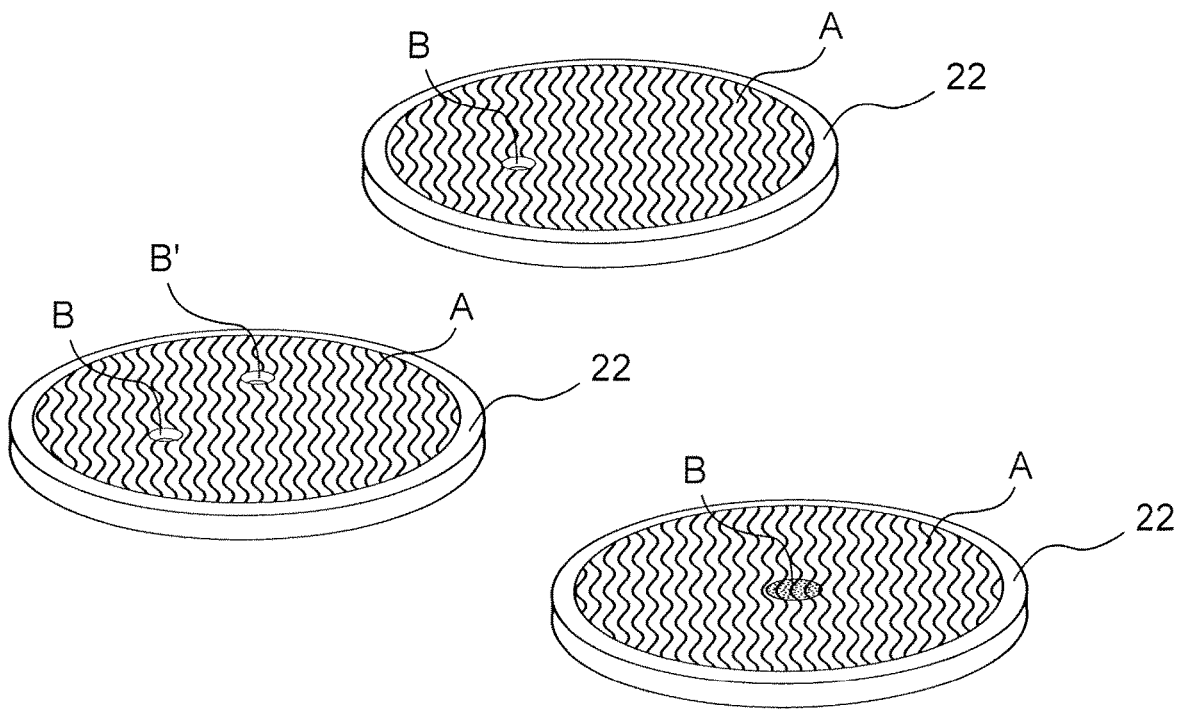
FIG. 4 shows schematic illustrations of various embodiments of an optical element according to the invention.

FIG. 4 shows schematic illustrations of different embodiments of an optical element 22 according to the invention. For example, the optical element 22 can be a mirror with a reflecting area A. The reflecting area A may comprise one or a plurality of passbands B, B', wherein the respective passbands B, B' are completely enclosed by the reflecting area A. The number, position, size, arrangement and spatial orientation of the passbands B, B' is defined via a solid angle range Ω, which is to be monitored, by the radiation, which is to be detected, of a detection device 20 comprising the optical element 22 according to the invention. In particular, the passbands B, B' can be designed as through-openings in the optical element 22. These can preferably be physical holes in the optical element 22. However, the passbands B, B' can also differ from the reflecting area A by the optical transparency. A physical hole is not required. Preferably, the passbands are designed circular or circular-cylindrical.

Figure 5:
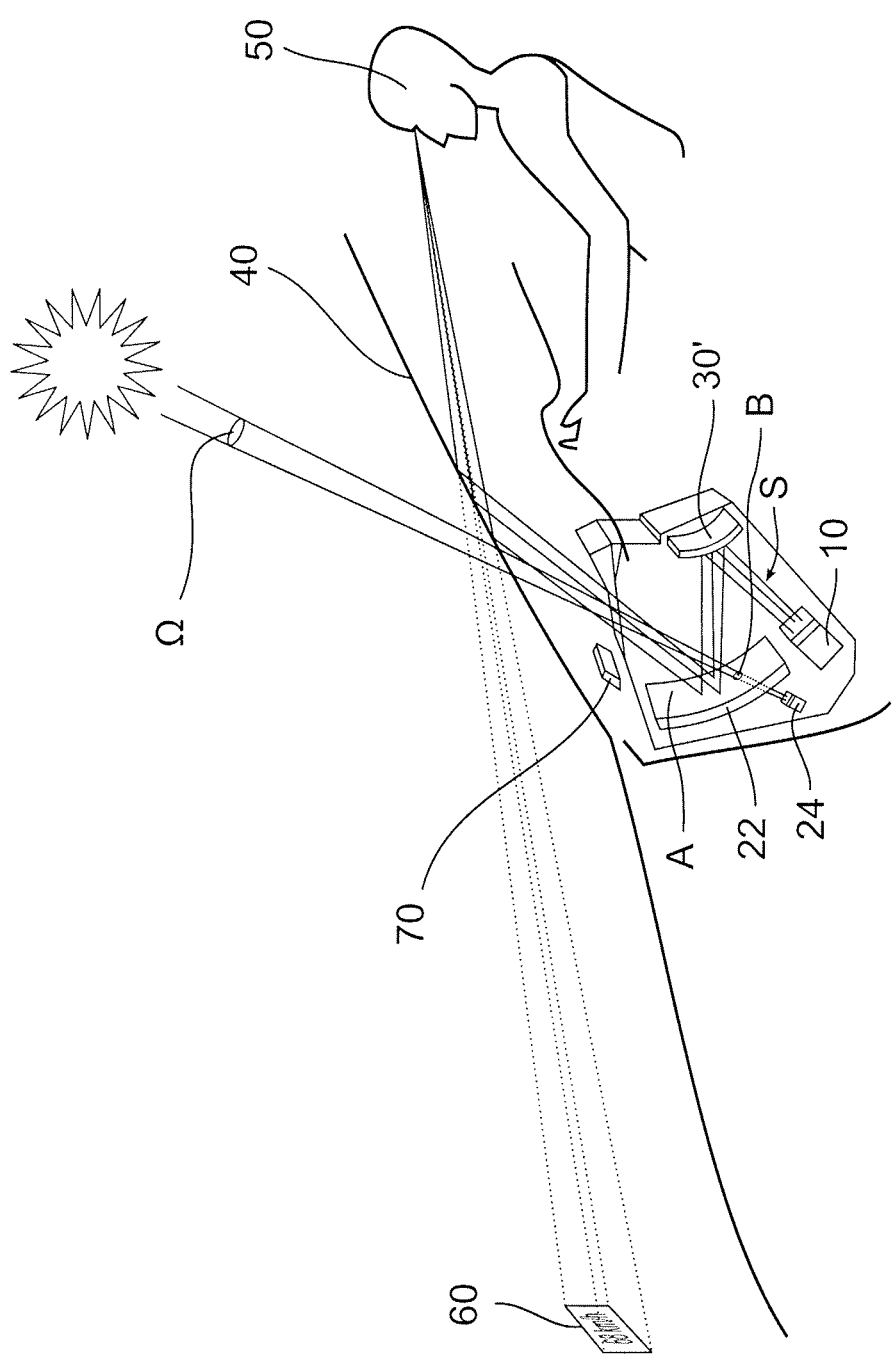
FIG. 5 is a schematic illustration of an HUD according to the invention installed in a motor vehicle.

FIG. 5 shows a schematic illustration of a HUD 100 according to the invention installed in a motor vehicle. The illustration substantially corresponds to the embodiment shown in FIG. 2. The individual reference symbols and their assignment apply accordingly. In contrast to FIG. 2, in this embodiment the detection device 20 according to the invention has been displaced into the area of the deflection mirror 30. Furthermore, the light trap 70 was laid in the area of the windshield 40.

REFERENCE LIST 10 imager
20 detection device
22 optical element
24, 24' detectors
30, 30' deflecting devices
40 windshield
50 viewer
60 virtual image
70 light trap
80 attenuator
100 head-up display
A reflecting area
B, B' passband
S optical radiation (of an imaging system)
Ω solid angle range

What is claimed is:

1. A detection device, comprising:
an optical element with a reflecting area and a passband,
wherein the optical element is a single deflection mirror with a reflecting continuous surface configured for uniformly deflecting optical radiation with impressed image information,
wherein the optical transparency of the passband is greater than the optical transparency of the reflecting area,
wherein the passband is completely enclosed by the reflecting area, and wherein the surface of the passband is smaller than the surface of the reflecting area; and
a single-element detector configured to determine the intensity of a radiation transmitted by the optical element in a region of the passband and incident on the single-element detector,
wherein a radiation transmitted by the optical element in a region of the passband is detected directionally and angle-selectively by the single-element detector, and wherein a maximum detectable solid angle range is defined over edge beams of a projection of an active surface of the detector through the passband.

2. The detection device according to claim 1, wherein a minimum distance of the detector from the reflecting area is greater than 1 mm and less than 500 mm.

3. The detection device according to claim 1, wherein the surface of the passband is less than 10% and greater than 0.001% of the surface of the reflecting area.

4. The detection device according to claim 1, wherein the optical transparency of the passband is greater than 90%.

5. The detection device according to claim 1, wherein the optical transparency of the reflecting area is less than 10%.

6. The detection device according to claim 1, wherein the passband is formed as a through-opening in the optical element.

7. A head-up display comprising:
an imager adapted to impress an image information on an optical radiation; and
an imaging system adapted to project the optical radiation, wherein the imaging system comprises:
an optical element with a reflecting area and a passband, wherein the optical element is a single deflection mirror with a reflecting continuous surface configured for uniformly deflecting incident optical radiation with impressed image information received from the imager, wherein the optical transparency of the passband is greater than the optical transparency of the reflecting area, wherein the passband is completely enclosed by the reflecting area, and wherein the surface of the passband is smaller than the surface of the reflecting area; and
a single-element detector configured to determine the intensity of a radiation transmitted by the optical element in a region of the passband and incident on the single-element detector;
wherein a radiation transmitted by the optical element in a region of the passband is detected directionally and angle-selectively by the single-element detector, and
wherein a maximum detectable solid angle range is defined over edge beams of a projection of an active surface of the detector through the passband;
the imager and the imaging system are arranged wherein a visible virtual image of an image information impressed on the optical radiation is displayed to a viewer.

8. The head-up display according to claim 7, wherein the optical element is arranged outside an intermediate image plane of the head-up display.

9. The head-up display according to claim 7, further comprising a light trap adapted to capture radiation incident into the head-up display.

10. The head-up display according to claim 7, further comprising an attenuator adapted to attenuate a radiation incident into the head-up display.

11. A method of operating a head-up display, the method comprising:

providing a head-up display including a single-element detection device and a single deflection mirror with a reflecting continuous surface configured for uniformly deflecting incident optical radiation with impressed image information received from an imager;
determining an intensity of a radiation incident on the single-element detection device, wherein the radiation is transmitted by the single deflection mirror in a region of a passband of the single deflection mirror;
generating a control signal from at least one intensity determined by the single-element detection device by a control device; and
adapting the head-up display in dependence on the control signal.

12. The method of operating a head-up display according to claim 11, the method further comprising generating a control signal based on the presence of a viewer and/or a further person.

13. The method of operating a head-up display according to claim 11, the method further comprising generating the control signal based on an operating state of the head-up display.

14. The method for operating a head-up display according to claim 11, wherein an adaptation of the head-up display is performed by at least one of attenuating a radiation or by amplifying an optical radiation of an imager.

15. The method for operating a head-up display according to claim 11, wherein an adaptation of the head-up display is performed by at least one of changing an angle or a position of at least one optical component of the head-up display for a directional deflection of a radiation incident into the head-up display.

16. A detection device, comprising:
an optical element with a reflecting area and a passband, wherein the optical element is a single deflection mirror with a reflecting continuous surface adapted for uniformly deflecting optical radiation with impressed image information,
wherein the optical transparency of the passband is greater than the optical transparency of the reflecting area, and
wherein the passband is completely enclosed by the reflecting area, and wherein the surface of the passband is smaller than the surface of the reflecting area; and
a single-element detector configured to determine the intensity of a radiation transmitted by the optical element in a region of the passband and incident on the detector,
wherein a radiation transmitted by the optical element in a region of the passband is detected directionally and angle-selectively by the detector,
wherein a maximum detectable solid angle range is defined over edge beams of a projection of an active surface of the detector through the passband, and
wherein the optical axis of the passband deviates from the surface normal of the reflecting area locally adjacent to the passband.

* * * * *